Aug. 18, 1931.  L. A. HOERR ET AL  1,819,815

PIPE CLAMP

Filed Feb. 6, 1930

Inventors
Louis A. Hoerr
F. H. Pietzsch
By E. E. Hoffman
Att'y.

Patented Aug. 18, 1931

1,819,815

UNITED STATES PATENT OFFICE

LOUIS A. HOERR AND FRANK H. PIETZSCH, OF ST. LOUIS, MISSOURI, ASSIGNORS TO RAILWAY DEVICES COMPANY, OF ST. LOUIS, MISSOURI, A CORPORATION OF MISSOURI

PIPE CLAMP

Application filed February 6, 1930. Serial No. 426,264.

Our invention relates to a pipe clamp and particularly to that type of pipe clamp adapted to secure the pipe to a supporting plate through an opening in which it passes, such for example, as a cross-bearer, sill or bracket of a railway car.

The object of our invention is to provide a simple and effective clamp of the kind referred to, which will accommodate itself to holes of varying diameter in the supporting member and the action of which will not be affected by variation in the thickness of said supporting member.

Figure 1:
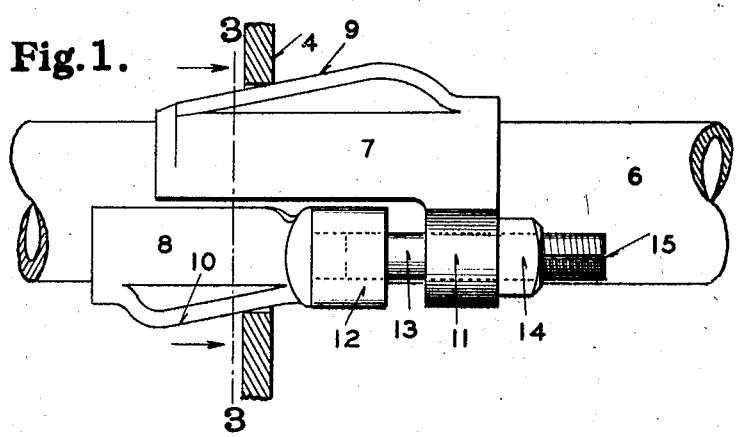
Figure 2:
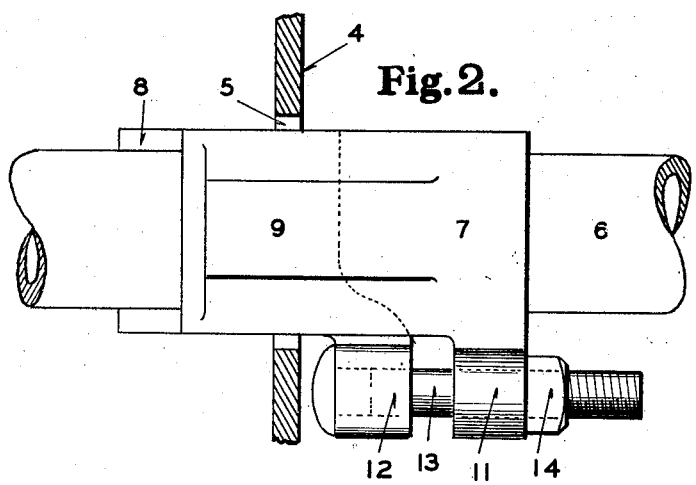
Figure 3:
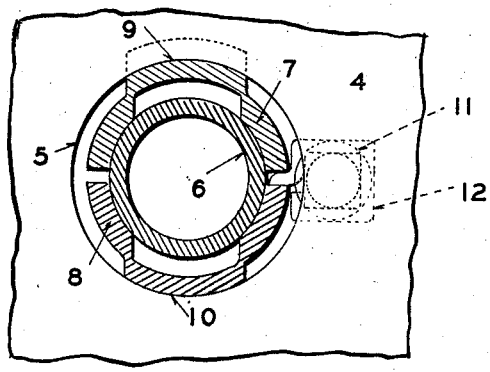

In the accompanying drawings which illustrate one form of pipe clamp made in accordance with our invention, Figure 1 is a side elevation; Figure 2 is a top plan view; and Figure 3 is a section taken on the line 3—3 of Figure 1.

The supporting member 4 may be a cross-bearer or other part of a railway car. In it is formed an opening 5 for the passage of the pipe 6. This opening is made considerably larger than the diameter of the pipe so as to permit the interposition of the clamping device between its edges and the periphery of the pipe.

The clamp is composed of two parts 7 and 8, each approximately semi-cylindrical in form and having their inner faces curved on the same radius as the periphery of the pipe so as to fit snugly against it. Formed on the part 7 is a wedge face 9 and on the part 8 a wedge face 10 diametrically opposed to it. These wedges are of equal inclination to the axis of the pipe and extend in the same direction so that their faces are parallel. The wedge faces may be formed in any manner, but we prefer to make them by stamping out portions of the metal of the parts 7 and 8, as best shown in Figure 3. This method of forming the wedge faces, together with the general configuration of the parts, enables us to readily and economically manufacture the device from pressed steel.

On the part 7 is a lug 11 and on the part 8 an aligning lug 12. Passing through these lugs is a bolt 13 on which is a nut 14 for drawing the lugs toward each other, thus moving the wedge faces in opposite directions to clamp the pipe in position in the supporting member and around the pipe. The lug 12 is square in cross section, engaging a correspondingly square part of the bolt adjacent to the head so as to prevent rotation of the bolt when the nut is tightened. The bolt may be provided with a split end 15, the spreading of which will prevent accidental loosening of the nut.

To apply the clamp the parts are separated by removal of the nut 14. The pipe is raised against the upper edge of the opening 5 leaving sufficient space between the lower side of the pipe and the lower edges of the opening 5 for the passage of the wedge end of part 8 between them. The part 8 is now inserted in position, the pipe lowered against it and the part 7 inserted, its lug 11 passing around the bolt 13. The nut is now applied to the bolt and tightened to draw the lugs 11 and 12 toward each other moving the parts 7 and 8 in opposite directions. As the high ends of the wedges lie on opposite sides of the supporting plate this movement will cause both wedges to function to clamp the parts 7 and 8 around the pipe and between the opposing faces of the supporting member.

Having fully described our invention, what we claim as new and desire to secure by Letters Patent of the United States is:

1. The combination with a support having an opening and a pipe extending therethrough, of a pair of clamping members each having a wedge face engaging with the edge of said opening, said wedge faces lying at opposite sides of the pipe and extending at opposite sides of the support, and means for moving said parts relatively longitudinally, whereby the pipe is clamped between the members and the members clamped to the support by the action of said wedge faces.

2. The combination with a support having an opening and a pipe extending therethrough, of a pair of approximately semi-cylindrical clamping members each provided with an outwardly extending wedge face engaging with the edge of said opening, said members being positioned at opposite sides of the pipe with the high ends of their wedges projecting in opposite directions from the support, and means for simultaneously moving said members in opposite directions with respect to said support.

3. The combination with a support having an opening and a pipe extending therethrough, of a pair of approximately semi-cylindrical clamping members each provided with an outwardly extending wedge face engaging with the edge of said opening, said members being positioned at opposite sides of the pipe with the high ends of their wedges projecting in opposite directions from the support, a bolt carried by one of said members, a lug on the other member through which said bolt passes, and a nut on said bolt for simultaneously moving said member longitudinally with respect to the support.

In testimony whereof, we hereunto affix our signatures, this 1st day of February, 1930.

LOUIS A. HOERR.
FRANK H. PIETZSCH.